INVENTOR.
WILLIAM A. STOVER
ROBERT C. WILSON, JR.
BY Raymond W. Barclay

ATTORNEY

United States Patent Office 2,773,845
Patented Dec. 11, 1956

2,773,845

TREATMENT OF CHROMIA-ALUMINA HYDROGEL

William A. Stover, Pitman, and Robert C. Wilson, Jr., Woodbury, N. J., assignors to Socony Mobil Oil Company, Inc., a corporation of New York Application July 30, 1952, Serial No. 301,672

8 Claims. (Cl. 252—465)

This invention relates to an improved process for preparing a chromia-alumina co-gelled catalyst useful in promoting conversion of petroleum hydrocarbons. More particularly, the present invention is directed to a method for treating a chromia-alumina hydrogel during the process of preparation to yield a resultant co-gelled catalyst exhibiting improved hardness, reforming activity and decreased coke formation.

In copending application Serial No. 201,537, filed December 14, 1950, by Stover and Wilson, there is described, among other things, a process for preparing a co-gelled catalytic composite of chromia and alumina having an inorganic oxide content of at least about 10 percent by weight. Such process has been set forth in detail in the aforementioned patent. For convenience herein, however, the following is offered as a brief description of said process.

A true all-embracing chromia-alumina hydrogel having a metal oxide product concentration of at least about 10 percent by weight and a relatively short gelation time, i. e., less than 2 hours and preferably less than 60 seconds is prepared by intimately admixing an organic chromium salt, such as chromic acetate, and an alkali metal aluminate, such as sodium aluminate, to produce a chromia-alumina hydrosol. The hydrosol so formed is permitted to set to a hydrogel. The resulting hydrogel is thereafter subjected to aging and then water-washed, dried, and calcined to yield a catalytic chromia-alumina composite. The relative proportions of chromia and alumina may be varied over a wide range. The chromia content of such composites will generally be in the range of 10 to 40 mole percent of $Cr_2O_3$ and the alumina content in the range of 60 to 90 mole percent of $Al_2O_3$.

It is preferred to use aqueous solutions of sodium aluminate and chromic acetate for preparation of the above-described hydrogels. Neither of these substances is a true chemical compound. The ratio of sodium to aluminum can be varied widely, as can the ratio of acetate to chromium ion. Variation in the sodium to aluminum ratio of the aluminate solution requires compensating adjustment of the acetate to chromium ratio of the second solution in order to achieve satisfactory gelation.

Figure 1 of the drawing annexed hereto presents data graphically illustrating relationships between acetate to chromium ratios and sodium to aluminum ratios which yield hydrosols capable of setting to hydrogels in less than about 20 seconds. Such hydrosols of short gelation time are particularly desirable for the production of bead-like spheroidal particles by methods well known in the art, for example, those described in patents to Marisic, such as U. S. Patent No. 2,384,946.

Referring more particularly to Figure 1, the area designated as 1 includes relationships involving quick setting hydrosols of low viscosity which can be readily handled at bead-forming nozzles. The area designated as 2 includes relationships involving slow setting hydrosols. These hydrosols may be handled in bead-forming equipment by application of heat to increase the velocity of the gelation process. The area designated as 3 includes hydrosols of very long gelation time. Some of the hydrosols included in this area have gelation times of 12 to 24 hours and consequently are unsatisfactory for bead formation. The relationships shown graphically in Figure 1 are readily reduced to mathematical expression. All of the sodium aluminate solutions have a sodium to an aluminum mole ratio designated hereinafter as "R" between 1 and 1.5. The preferred area 1 is further defined in stating that the acetate to chromium mole ratio is not less than 4R–2.8 and not more than 4R–2.4. The operative range of values, including areas 1 and 2, involves the same maximum of 4R–2.4, but the minimum is 2.8R–1.8.

Control of the mole ratios discussed above is readily achieved in the manufacture of the reactant solutions. Chromic acetate is readily formed without introduction of undesirable extraneous materials by reducing sodium dichromate with glycolic acid in the presence of acetic acid. Sodium dichromate and acetic acid are mixed and heated at atmospheric pressure. After heating to 100–240° F., the glycolic acid is gradually added. Thereafter, the mixture is digested at 210–240° F. until evolution of carbon dioxide therefrom has ceased. The proportions of reactants used may be varied within wide limits to form the chromic acetate complex at desired mole ratios. This method for preparing chromic acetate is more fully described and claimed in copending application Serial No. 174,594, filed July 18, 1950 and issued as U. S. 2,615,031 on October 21, 1952.

Sodium aluminate of satisfactory quality has been prepared from caustic soda of 50 Bé. and alumina trihydrate. At a sodium to aluminum ratio in the range of 1.25/1 to 1.5/1, the sodium aluminate is advantageously manufactured in an open agitated kettle at 220–230° F. with a reaction time of 1 to 3 hours. Solutions having a lower mole ratio down to about 1.0/1 are made in an autoclave at 240–300° F. and a pressure of 10 to 30 pounds per square inch gauge at the same reaction time. Sodium aluminate solutions having a low sodium to aluminum ratio, less than 1.3, are relatively unstable and may be stabilized by the addition of such organic materials as glycerin, starch, sugar, and the like.

Thus, chromia-alumina hydrogels having a short time of set and a high solids content generally between about 10 and about 30 percent by weight may readily be prepared by controlling the sodium to aluminum mole ratio of the sodium aluminate solution employed and the acetate to chromium mole ratio of the chromic acetate solution. The specific ratios employed will depend upon the particular composition of the chromia-alumina hydrogel desired.

Temperature, pH, and product concentration are interrelated variables effecting gelation and, within the limits in which formation of hydrogels occurs, they control gelation time. In general, the other factors can be controlled to achieve gelation at any practical solution temperature. Thus, temperatures from 30° F. to 150° F. have been used. Best gelation times have been experienced at temperatures between about 120 and about 140° F. The pH of the chromia-alumina hydrogels is generally between 10 and 13. For bead formation, a pH value of about 12 has been found to yield excellent results.

For the production of chromia-alumina hydrogel beads, preparation is carried out substantially the same as that described in the above noted Marisic patent for producing silica-alumina beads. Thus, a chromic acetate solution and a sodium aluminate solution are contacted in a mixing nozzle and discharged onto the apex of a dividing cone from which a number of small streams flow into a column of water-immiscible liquid. The temperature of said water-immiscible liquid is desirably maintained at a constant temperature by circulation through a heat exchanger outside the bead forming tower.

The freshly formed chromia-alumina hydrogel above described is subject to a loss of aluminum as sodium aluminate if immediately washed with water. This tends to weaken the hydrogel to such an extent that it disintegrates in the wash water. In accordance with the present invention, that adverse effect can be avoided by immediately treating the freshly formed hydrogel in a slightly alkaline aqueous medium of controlled pH. This is generally accomplished by bringing the freshly formed chromia-alumina hydrogel into contact with an aqueous solution of a salt or acid capable of affording the requisite equilibrium pH. It has been found in accordance with the instant invention that the pH of said aqueous medium is a critical factor affecting the hardness and reforming activity of the resultant co-gelled catalyst. It has been found that the pH of the aqueous medium in contact with the hydrogel should be between 8.0 and 9.5 and preferably between 9.0 and 9.5. In a typical operation, the fresh hydrogel beads are sluiced out of the forming tower with oil. The hydrogel beads are then separated from the oil and treated with an aqueous solution of ammonium sulfate. The solution is advantageously kept at a pH of 8.0 to 9.5 by the addition of sulfuric acid. It has been found advisable to maintain a solution of this type in contact with the freshly formed hydrogel for some time after formation, generally for at least about 2 hours and preferably 4 hours or longer. For example, the solution may be recirculated through the freshly formed hydrogel or otherwise maintained in contact therewith for a period of from about 2 to about 24 hours after forming in order to fix the alumina. Such treatment of the freshly formed hydrogel is designated herein as "aging."

After the aging treatment, the chromia-alumina hydrogel is water-washed free of anions introduced during aging. Chromia-alumina hydrogel is relatively difficult to wash and hydrogel beads of such composition normally require 16 to 68 hours of water washing. This is apparently due to the relatively high product concentration of these hydrogels. However, excessive water-washing should be avoided because of the tendency to peptization resulting in at least partial disintegration of the hydrogel. This effect has been noted when the hydrogel is washed for more than 24 hours after the effluent wash water is free of the anion introduced during aging, i. e., free of sulfate ions when the aging treatment is effected with an aqueous ammonium sulfate solution.

The washed hydrogel can be satisfactorily dried in either superheated steam or heated air. The dried hydrogel is thereafter suitably tempered in an inert or reducing atmosphere at an elevated temperature to yield a hard, catalytically active co-gel of chromia-alumina.

In accordance with the procedure of the present invention, it has been found that control of the pH of the aging solution is an important factor in influencing the physical and catalytic characteristics of the resultant chromia-alumina gel. It has been found that the pH of the aging solution should be between about 8.0 and 9.5 and preferably between about 9.0 and 9.5. The aging solution may be made up of an aqueous solution of a salt or acid capable of affording a pH in the above range when brought into contact with the freshly formed chromia-alumina hydrogel. The aging solution may suitably be an ammonium acid salt such as ammonium sulfate, ammonium nitrate, ammonium chloride, ammonium acetate, ammonium carbonate, and the like. The choice of a particular salt is largely a matter of economics and, of the foregoing, an ammonium mineral acid salt such as ammonium sulfate is accorded preference. Ordinarily, a concentration of 10 to 20 per cent by weight ammonium salt will be employed in the aging solution. The desired pH of 8.0 to 9.5 is controlled at this level by the addition of an acid, usually a mineral acid, such as sulfuric acid, to the aging solution. It is necessary that the hydrogel be maintained in contact with the aging solution for at least about 2 hours and preferably for at least about 4 hours in order that the sodium content of the hydrogel may be reduced to an extent such that it does not appreciably interfere with the catalytic activity of the final catalyst. The aging is carried out preferably at room temperature (70° F.) or lower, particularly where an ammonium salt solution is employed since, at higher temperatures, loss of ammonia is encountered. The aging solution can be reused several times with a sufficient make-up of salt and acid to achieve the desired pH range.

Having described in a general way the nature of this invention, it may be more readily understood by reference to the following illustrative non-limiting examples:

*Example 1*

A chromia-alumina hydrogel was prepared from the following reactants:

Solution A: 250 cc. of sodium aluminate solution containing 3.1 moles $Al_2O_3$ per liter, 250 cc. distilled water;
Solution B: 250 cc. chromic acetate solution containing 1.2 moles $Cr_2O_3$ per liter, 250 cc. distilled water.

Solution B was added rapidly to Solution A at a temperature of 70° F. with agitation. The hydrosol so formed was poured into trays and set to a hydrogel in 20 seconds. The resulting hydrogel having a pH of 10.1 was cut into cubes and treated with 10 per cent by weight aqueous ammonium sulfate solution. The cubes were then washed with distilled water until a sulfate-free wash water was indicated. The product concentration of the resulting hydrogel was 11 per cent by weight. The cubes were dried in 100 per cent steam at 260–270° F. for 3 hours and then calcined 4 hours at 1100° F. in air. The resulting gel composite contained 33 mol per cent of $Cr_2O_3$ and 67 mole per cent of $Al_2O_3$. The gel also contained .014 weight per cent sodium and 5.3 weight per cent sulfate as undesirable impurities. The gel had a surface area of 210 square meters per gram and proved to be an effective catalyst for reforming petroleum naphthas.

*Example 2*

A chromia-alumina hydrogel was prepared from the following reactants:

Solution A: 390 cc. of sodium aluminate solution containing 2.0 moles $Al_2O_3$ per liter;
Solution B: 260 cc. of chromic acetate solution containing 1.0 mole $Cr_2O_3$ per liter.

Gelation was carried out employing the procedure of Example 1. However, because the hydrogel was formed at a pH of 9.1, the hydrogel cubes were treated with 1 percent by weight of aqueous ammonium sulfate solution. The cubes were washed with distilled water until a sulfate-free wash water was indicated. The resulting hydrogel had a product concentration of 16 percent by weight. The hydrogel was dried and tempered in the same manner as in Example 1. The resulting gel composite contained 44 mole percent $Cr_2O_3$ and 56 mole percent $Al_2O_3$. The finished gel contained 0.02 weight percent sodium and 5.8 weight percent sulfate as undesirable impurities. The gel had a surface area of 215 square meters per gram and proved to be an effective reforming catalyst.

*Example 3*

A chromia-alumina hydrogel was prepared from the following reactants:

Solution A: 47.5 pounds sodium aluminate made up to a volume of 10 gallons with distilled water;
Solution B: 48 pounds chromic acetate, the acetate to chromium ratio of which is adjusted within the approximate range of 2.6 to 2.8 and then made up to a volume of 13 gallons with distilled water, providing a solution containing 0.92 mole $Cr_2O_3$ per liter.

Solutions A and B were pumped separately under pressure through heating coils to an efficient mixing nozzle. The solutions were heated to about 110° F. and mixed in equal volumes at a total rate of 1200 cc. per minute. The resulting stream of hydrosol flowed over a divider into a column of oil. The hydrosol set to beads of hydrogel and the resulting hydrogel beads were sluiced from the bottom of the forming tower with a 20 percent by weight aqueous solution of ammonium sulfate. The sluicing solution was maintained at a pH of 8.5 by the addition of sulfuric acid. Since the pH of the hydrogel was about 10.5, it was necessary to add sulfuric acid to the sluicing solution in order to maintain the pH at 8.5. The bead hydrogel was aged for 24 hours in the same solution that was used to sluice from the forming tower. After aging, the gel was washed until a sulfate-free wash water was indicated. The washed hydrogel had a product concentration of 21 percent by weight. The hydrogel was thereafter dried in 100 percent steam at 260–270° F. for 3 to 4 hours and then tempered 4 hours at 1100° F. in a hydrogen atmosphere. The resulting beads of gel contained 21 mole percent $Cr_2O_3$ and 79 mole percent $Al_2O_3$.

Comparative examples carried out similar to Example 3 establish that there is no apparent difference in the properties of the catalyst treated with ammonium salts other than ammonium sulfate. For example, comparative data obtained by aging the hydrogel beads in ammonium sulfate and ammonium nitrate solutions are shown below:

| Aging Salt | $(NH_4)_2SO_4$ | $NH_4NO_3$ | |
| --- | --- | --- | --- |
| Concentration, Percent Wt | 10 | 10 | 15 |
| pH of Aging Solution | 9.6 | 9.6 | 9.5 |
| Properties of Catalyst: | | | |
| Hardness Index | 80 | 77 | 70 |
| Sodium Content, Percent Wt | 0.59 | 0.65 | 0.43 |
| Sulfate Content, Percent Wt | 0.06 | | |

The hardness index referred to in the foregoing table was determined as follows:

An 80 cc. sample of material was tumbled in a one-pound grease can with eight 15/16-inch steel balls, 50 grams each at 80 R. P. M. on a paint roller mill for a period of 1 hour. The product was screened to determine the quantity which was powdered and broken down to a size smaller than the original. The percentage of unbroken particles is designated as "hardness index."

The effect of ammonium salt concentration in the aging solutions was studied with fresh solutions. It was found that an increase in ammonium sulfate concentration resulted in (1) a decrease in the equilibrium pH of the aging solution, and (2) a decrease in the sodium content with an accompanying increase in activity of the finished catalyst. Illustrative data are shown below:

| $(NH_4)_2 SO_4$, Percent Wt | 5 | 10 | 15 | 20 |
| --- | --- | --- | --- | --- |
| pH of Aging Solution | 9.8 | 9.6 | 9.4 | 9.1 |
| Properties of Catalyst: | | | | |
| Sodium Content, Percent Wt.[1] | 1.65 | 0.47 | 0.17 | 0.05 |
| Sulfate Content, Percent Wt | 0.11 | 0.12 | 0.04 | 0.08 |
| Hardness Index | 84 | 67 | 73 | 75 |
| Reforming Test Unit Data: | | | | |
| Syn Crude, Percent Vol | 87.7 | 88.5 | 87.9 | 85.6 |
| CFRR, Clear | 70 | 72.5 | 74 | 76 |
| Gas, Percent Wt | 10.9 | 10.2 | 10.6 | 13.2 |
| Coke, Percent Wt | 0.0 | <0.1 | <0.1 | 0.1 |

[1] These catalysts were washed until a $SO_4$-free effluent was indicated (23–33 hrs.); prolonged washing will further reduce the sodium content.

Reforming test data were obtained employing a charge of Oklahoma City light naphtha under the following conditions:

| | |
| --- | --- |
| L. H. S. V. | 1.0. |
| Temp. | 1000° F. |
| $H_2$/H. C. mole ratio | 5. |
| Total pressure | 200 p. s. i. g. |
| Time on stream | 2 hrs. |

A reduction in the pH of the ammonium sulfate aging solution below 9.0, and particularly below 8.0, shows no further improvement in the activity of the treated catalyst but actually has a deleterious effect on the physical strength of the resultant catalyst as shown by data set forth below:

| pH of Aging Solution | 9.0 | 8.0 | 7.5 | 6.0 |
| --- | --- | --- | --- | --- |
| Hardness Index | 64 | 35 | 26 | 18 |
| Reforming Test Unit Data: | | | | |
| Syn Crude, Percent Vol | 84.6 | 85.7 | 83.9 | 85.3 |
| CFRR, Clear | 79.5 | 79.5 | 80 | 79 |

The reforming test data were obtained with the stock and under the conditions described above.

It has been established that the initial pH of fresh aging solution can be varied from about 4.0 to 8.0 without affecting the properties of the finished catalyst since the pH immediately rises to about 9.0 to about 9.5 upon contacting the hydrogel. Thus, freshly formed chromia-alumina hydrogel in the form of beads having a pH of about 12 can be treated directly with a 20 percent by weight aqueous ammonium sulfate solution having a pH of approximately 4.

The sodium content of the finished catalyst should be desirably less than 0.15 percent by weight and preferably less than 0.05 percent by weight. Taking this desired sodium content into account, the minimum aging period is about 2 hours and preferably at least about 4 hours. Aging for longer periods of time up to 24 hours or more has no further effect on the properties of the catalyst. Typical data of chromia-alumina hydrogel beads prepared similar to that of the process in Example 3 are presented in the following table:

| Aging Period, Hrs | 1 | 4 | 8 | 12 | 16 | 20 | 24 |
| --- | --- | --- | --- | --- | --- | --- | --- |
| Properties of Catalyst: | | | | | | | |
| Sodium Content, Percent Wt | 2.0 | 0.09 | 0.11 | 0.06 | 0.08 | 0.09 | 0.04 |
| Sulfate Content, Percent Wt | 0.02 | 0.03 | 0.02 | 0.03 | 0.08 | 0.07 | 0.07 |

Contact of the freshly formed hydrogel with the aging solution may be carried out either as a batch or continuous operation. Thus, the chromia-alumina hydrogel may be permitted to soak in the aging solution under substantially static conditions for the requisite time or the hydrogel in the form of spheroidal globules or particles of any other desired shape may be passed through a bath of the aging solution or alternatively the aging solution may be circulated through a stationary bed of the hydrogel particles. Also, contact between the aging solution and the hydrogel particles may be accomplished by countercurrent passage thereof through an elongated treating zone. It is preferred, however, to circulate the aging solution through the hydrogel particles continuously with such additional make-up solution as is required to maintain the desired volume and pH. Thus, in practice, ammonium sulfate (20 percent by weight initial concentration) aging solution has been re-used successfully a number of times with 20 percent make-up per batch of hydrogel treated. A 30 percent by weight ammonium sulfate solution was used for make-up. The aging solution was circulated through the chromia-alumina hydrogel particles at a rate of 0.01 volume per minute per volume of hydrogel particles, and concentrated sulfuric acid was added to maintain the pH of the aging solution in the desired range of 9.0 to 9.5.

The pH of the aging solution exerts a marked effect on subsequent washing of the chromia-alumina hydrogel. Thus, the optimum water rate for washing chromia-alumina hydrogel particles depends upon the properties of the aged hydrogel. For example, chromia gels containing 27 percent by weight $Cr_2O_3$ require lower water rates and correspondingly longer washing periods than do chromia gels containing 32–34 percent by weight $Cr_2O_3$. The use of high wash water rates results in a very low sulfate content in the effluent water, assuming ammonium sulfate was employed as the aging solution, before all soluble salts are removed from the hydrogel. Excessively high water rates will, moreover, peptize the surface of the hydrogel particles, thereby resulting in a finished catalyst having poor physical properties. Generally, the optimum water rate for washing the chromia-alumina hydrogel particles is between about 0.005 and about 0.02 volumes of water per minute per volume of hydrogel particles. For a typical catalyst (32 percent by weight $Cr_2O_3$ and aged at a pH of about 9.5), the optimum water rate is about 0.01 volume of water per minute per volume of hydrogel particles. Illustrative data obtained upon water washing chromia-alumina spheroidal beads prepared similar to the process of Example 3 are shown below:

| Water Rate, vol. H₂O/min./vol. beads | 0.004 | 0.008 | 0.013 | 0.019 |
|---|---|---|---|---|
| Sulfate content of washed beads, p. p. m | 1,200 | 200 | 17 | ¹ 200 |
| Properties of Finished Cat.: | | | | |
| Sodium, Percent Wt | 0.40 | 0.06 | 0.03 | 0.04 |
| Whole Beads, Percent Wt | ² 44 | 91 | 95 | 91 |
| Hardness Index | 83 | 96 | 98 | 96 |

¹ Peptized gel interfered with SO₄ test.
² Beads broke during drying and tempering because of high salt concentration in the hydrogel.

The time required to wash the above-described chromia-alumina hydrogel is closely related to the conditions employed in the aging operation since the ease with which cations and anions, for example sodium and sulfate ions, are removed from the hydrogel is largely dependent upon the pH of aging. The pH of the aging solution governs the adsorption of sodium and sulfate ions. Sodium ions are strongly adsorbed at a pH above 9.5 while sulfate ions are strongly adsorbed at a pH below 9.0. At a pH in the range of 9.0–9.5, sodium and sulfate ions appear to be equally adsorbed. The effect of the pH of the aging solution was studied in washing experiments in which the washing was conducted until a sulfate-free effluent was obtained. The results showed that the required washing time was reduced as the pH of the aging solution increased and that the sodium content of the finished catalyst varied inversely with washing time. When the aging is carried out at a pH above 9.5, the washing must be continued well beyond the point where sulfate-free effluent is obtained in order to reduce the sodium content to an acceptable level.

Figure 2 of the drawing shows the effect of the pH of the aging solution on the required washing time.

Figure 1:
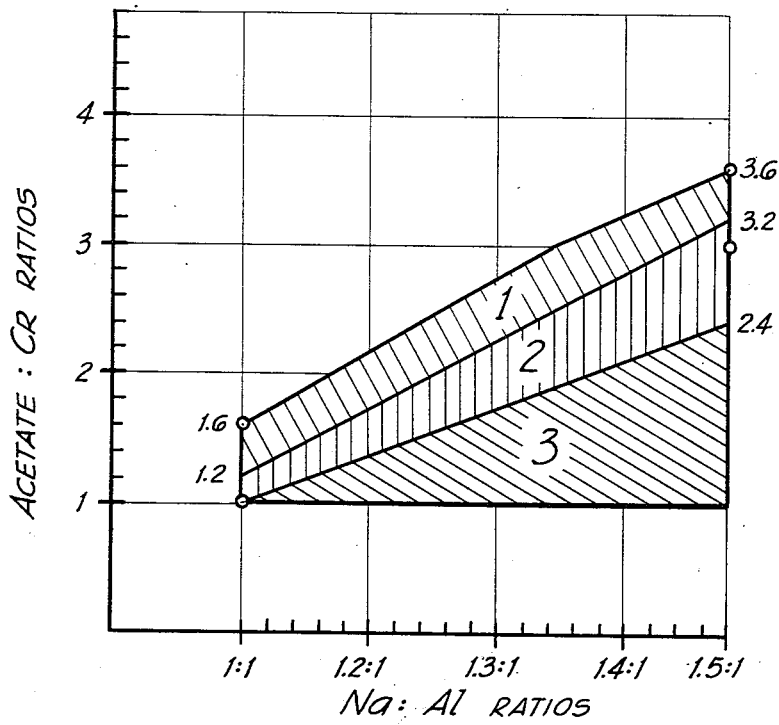
Figure 2:
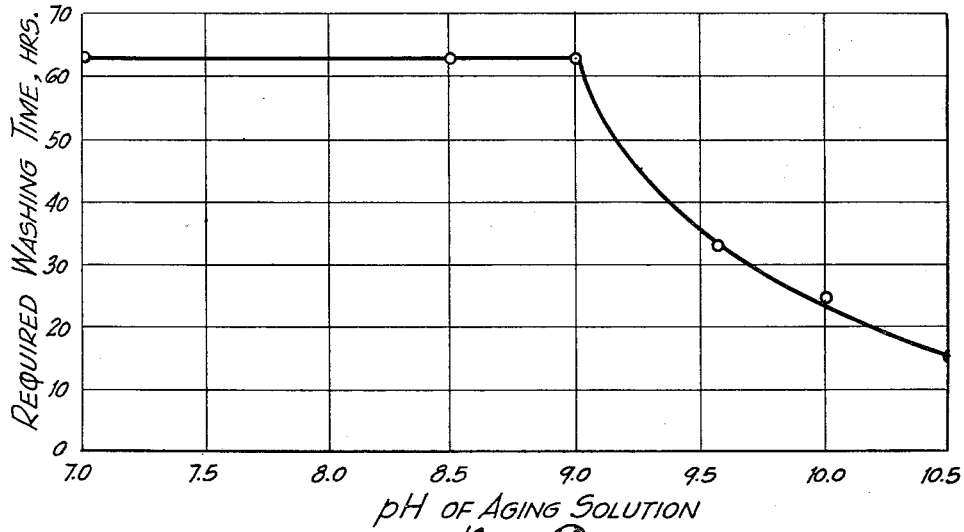
Figure 3:
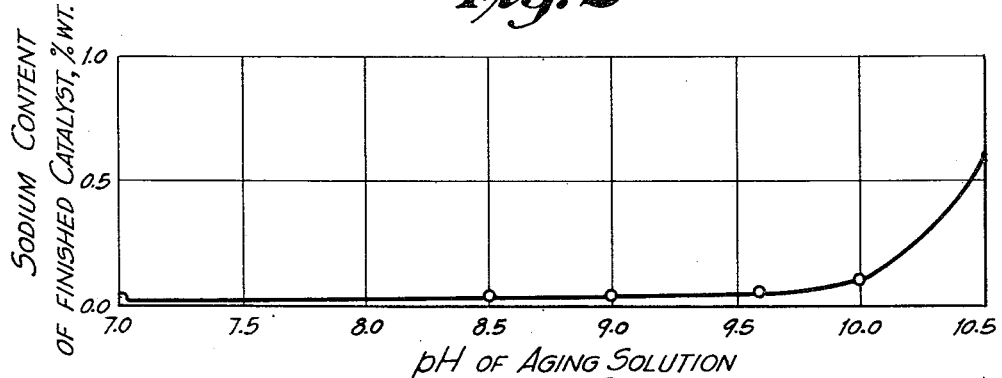
Figure 3 shows the effect of the pH of the aging solution on the sodium content of the finished catalyst.
Figure 4:
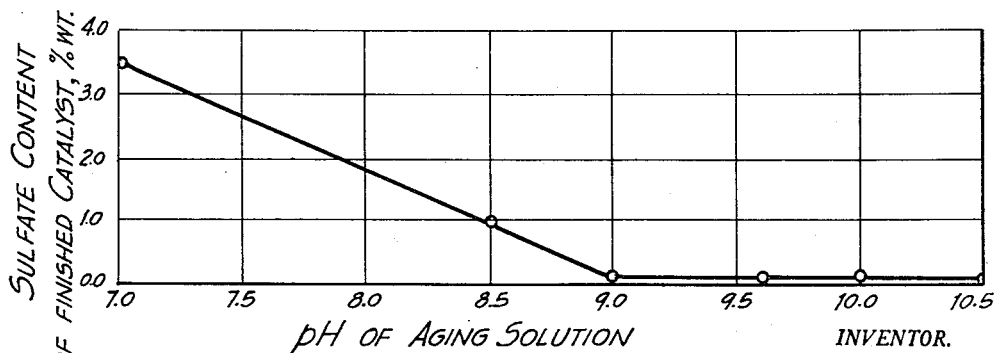
Figure 4 shows the effect of the pH of the aging solution on the sulfate content of the finished catalyst.

It will be seen from the data presented graphically in Figures 2–4 that the pH of the aging solution is desirably maintained within the range 8.0 to 9.5 and preferably at a pH of 9.0 to 9.5 since, in this latter preferred range, the sodium and sulfate content of the finished catalyst is at a minimum.

While certain details referred to in the foregoing description have been directed to the formation and treatment of the hydrogel in the form of chromia-alumina beads, it is to be realized that the treating procedure of this invention may be practiced upon chromia-alumina hydrogels of any other desired form or shape. It is further to be noted that, while certain details of the process described herein have been directed to the use of an ammonium sulfate aging solution, other compounds capable of affording an alkaline medium upon contact with the freshly formed hydrogel, to yield an equilibrium pH within the range of 8.0 and 9.5, may likewise be employed. Accordingly, it is to be understood that the above description is merely illustrative of preferred embodiments of the invention, of which many variations may be made within the scope of the following claims by those skilled in the art without departing from the spirit thereof.

This application is a continuation-in-part of copending application Serial No. 201,537, filed December 14, 1950.

We claim:

1. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the acetate to chromium ion ratio in said solutions to effect rapid gelation of said hydrosol to a hydrogel and water-washing and drying the resulting hydrogel, the improvement which comprises aging said hydrogel, before said washing, for at least 2 hours in an alkaline medium having a pH between 8.0 and 9.5.

2. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the acetate to chromium ion ratio in said solutions to effect rapid gelation of said hydrosol to a hydrogel and water-washing and drying the resulting hydrogel, the improvement which comprises aging said hydrogel, before said washing, for at least 4 hours in an alkaline medium having a pH in the range of 9.0 to 9.5.

3. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a fluid medium substantially immiscible with water wherein the globules assume a spheroidal shape and set to hydrogel, washing the spheroidal hydrogel and drying the washed hydrogel, the improvement which comprises aging the spheroidal hydrogel for at least about 2 hours, prior to said washing, in an alkaline medium having a pH controlled between 8.0 and 9.5.

4. In the production of chromia-alumina spheroidal gel particles prepared by mixing aqueous solutions of sodium aluminate and chromium acetate in amounts to yield a hydrosol having a pH of about 10 to about 13 and a chromia-alumina content of between about 10 and about 30 percent by weight, the sodium to aluminum ion ratio in said sodium aluminate solution and the acetate to chromium ion ratio in said chromium acetate solution being so maintained as to effect rapid gelation of said hydrosol, admitting said hydrosol in the form of globules to a body of a substantially water-immiscible fluid wherein the globules set to spheroidal particles of hydrogel, washing the spheroidal hydrogel particles and drying the washed particles, the improvement which comprises aging the spheroidal hydrogel particles for at least 4 hours, prior to washing, in an alkaline medium having a pH in the range of 9.0 to 9.5.

5. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the acetate to chromium ion ratio in said solutions to effect rapid gelation of said hydrosol to a hydrogel and water-washing and drying the resulting hydrogel, the improvement which comprises aging said hydrogel, before said washing, for at least 2 hours, in an aqueous solution of an ammonium salt, the pH of which is maintained between 8.0 and 9.5.

6. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the acetate to chromium ion ratio in said solutions to effect rapid gelation of said hydrosol to a hydrogel and water-washing and drying the resulting hydrogel, the improvement which comprises aging said hydrogel, before said washing, for at least 4 hours, in an aqueous ammonium sulfate solution, the pH of which is maintained between 9.0 and 9.5.

7. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the actate to chromium ion ratio in said solutions to effect rapid gelation of said hydrosol to a hydrogel and water-washing and drying the resulting hydrogel, the improvement which comprises aging said hydrogel, before said washing, for at least 2 hours, in an aqueous solution of an ammonium acid salt, the pH of which is maintained between 8.0 and 9.5 by the addition of a controlled quantity of an acid.

8. In the production of a chromia-alumina co-gel prepared by mixing aqueous solutions of sodium aluminate and chromium acetate to yield a hydrosol having a chromia-alumina content of at least about 10 percent by weight and controlling the sodium to aluminum ion ratio and the acetate to chromium ion ratio in said solutions to effect rapid gelation of said hydrosol to a hydrogel and water-washing and drying the resulting hydrogel, the improvement which comprises aging said hydrogel, before said washing, for at least 4 hours, in an aqueous ammonium sulfate solution, the pH of which is maintained between 9.0 and 9.5 by the addition of a controlled quantity of sulfuric acid.

References Cited in the file of this patent
UNITED STATES PATENTS

| | | |
|---|---|---|
| 2,323,868 | Hughes | July 6, 1943 |
| 2,363,498 | Burk et al. | Nov. 28, 1944 |
| 2,410,558 | Webb et al. | Nov. 5, 1946 |
| 2,620,314 | Hoekstra | Dec. 2, 1952 |
| 2,635,082 | Smith | Apr. 14, 1953 |